(12) United States Patent
Kim

(10) Patent No.: US 7,263,364 B2
(45) Date of Patent: Aug. 28, 2007

(54) DATA COMMUNICATION METHOD FOR MOBILE COMMUNICATION SYSTEM

(75) Inventor: Hoe-Won Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 132 days.

(21) Appl. No.: 10/754,801

(22) Filed: Jan. 9, 2004

(65) Prior Publication Data

US 2004/0198367 A1    Oct. 7, 2004

(30) Foreign Application Priority Data

Jan. 10, 2003    (KR) .................... 10-2003-0001696

(51) Int. Cl.
*H04Q 7/20* (2006.01)
(52) U.S. Cl. .................. 455/452.1; 455/464; 455/465
(58) Field of Classification Search ............ 455/452.1, 455/13.1, 12.1, 463, 464, 465; 370/282, 370/296; 376/365, 368, 376; 714/749, 712
See application file for complete search history.

(56) References Cited

U.S. PATENT DOCUMENTS 5,966,378 A * 10/1999 Hamalainen ............... 370/348
6,301,231 B1 * 10/2001 Hassan et al. ............... 370/316
6,467,059 B1 * 10/2002 Ohashi ....................... 714/749
6,760,393 B1 *  7/2004 Alisobhani et al. ......... 375/365

OTHER PUBLICATIONS

Dailey; Methods, Systems, and Terminals for providing Group communications over a common traffic channel; Nov. 16, 2000; WO 00/691190.*

* cited by examiner

*Primary Examiner*—Melur Ramakrishnaiah
(74) *Attorney, Agent, or Firm*—The Farrell Law Firm

(57) ABSTRACT

A data communication method for a mobile communication system reduces the consumption of resources when a desirable half-duplex data connection is provided. The data communication method includes the steps of: a) determining whether data communication is needed between at least two MSs (Mobile Stations) located in a service area of one BTS (Base Transmit Subsystem); b) if the data communication between the MSs is needed, assigning one physical half-duplex data channel to the MSs in common; and c) if data is transmitted to the MSs over a downlink channel of the half-duplex data channel, adding a header to the data to create data, and transmitting the data to the MSs.

6 Claims, 4 Drawing Sheets

DATA COMMUNICATION METHOD FOR MOBILE COMMUNICATION SYSTEM

PRIORITY

This application claims priority to an application entitled "DATA COMMUNICATION METHOD FOR MOBILE COMMUNICATION SYSTEM", filed in the Korean Intellectual Property Office on Jan. 10, 2003 and assigned Serial No. 2003-01696, the contents of which are hereby incorporated by reference.

BACKGROUND OF THE INVENTION

1. Field of the Invention

The present invention relates to a mobile communication system, and more particularly to a data communication method for a mobile communication system.

2. Description of the Related Art

FIG. 1 is a view illustrating a schematic diagram of a conventional mobile communication system. Referring to FIG. 1, mobile stations (MSs) 110 and 112 are connected to a BTS (Base Transmit Subsystem) 120 over an air interface, and a MS 114 is connected to a BTS 122 over the air interface. The BTSs 120 and 122 are wirelessly connected to the MSs 110 and 112, and the other BTS 122 is wirelessly connected to the MS 114. Upon receiving each incoming call for MSs of corresponding service areas from a BSC (Base Station Controller), the BTSs transmit the incoming call to a corresponding MS. Then, if the MS transmits an outgoing call to the BTS, the BTS transmits the outgoing call to the BSC 130. The BSC 130 manages the overall call control processes such as a voice call process, circuit call process, and packet call process, etc., of each MS. Also, the BSC 130 performs signaling with a MSC (Mobile Switching Center), and performs a handover operation.

The MSC 140 is connected to a HLR (Home Location Register) 150. The MSC 140 performs a call connection/switching function for processing incoming/outgoing request signals entering the MSs 110, 112 and 114, and performs a network-interworking function with other MSCs. HLR (Home Location Register) 150 is a database for storing/managing data of mobile phone subscribers. The HLR 150 registers or deletes a subscriber's location, and inquires about subscriber information.

Multiple-access wireless communication between the BTSs 120 and 122 and the MSs 110, 112, and 114 in such a mobile communication system is established over RF (Radio Frequency) channels for providing the mobile communication system with physical paths to transmit a plurality of communication signals such as an audio signal, a data signal, and an image signal, etc. Uplink channels, indicated as dotted lines in FIG. 1, are adapted to establish a call connection state among the BTSs 120 and 122 and the MSs 110, 112 and 114 or adapted to answer a message received from a paging channel. The downlink channel, indicated as solid lines in FIG. 1, is adapted to transmit voice or data signal information to the prescribed MSs 110, 112 and 114 at the BTSs 120 and 122. That is, one wireless channel is composed of one uplink channel and one downlink channel.

For instance, in the case where two MSs 110 and 112 connected to the BTS 120 are interconnected to each other such that data is interchangeable between the MSs 110 and 112 over the BTS 120, one wireless channel composed of one uplink channel and one downlink channel is assigned between the MS 110 and the BTS 120, and the other wireless channel is assigned between the MS 112 and the BTS 120.

In conclusion, two uplink channels and two downlink channels are used between the MSs 110 and 112 to establish data communication between the MSs 110 and 112.

The aforementioned connection scheme for the conventional mobile communication system is indispensable for a full-duplex connection requiring two-way simultaneous data transmission. However, if only one-way data transmission is required at a prescribed time, for example, if one MS sends a file to a counterpart MS in the range of short distance (i.e., within a service area of one BTS), two-way channels assigned each MS are adapted to interchange signaling command/response messages for establishing a wireless access state with others, but there is little traffic on such two-way channels, resulting in unnecessary consumption of most of channel capacities.

SUMMARY OF THE INVENTION

Therefore, the present invention has been made in view of the above problems, and it is an object of the present invention to provide a data communication method for a mobile communication system for reducing the consumption of resources when a desirable half-duplex data connection is provided.

In accordance with the present invention, the above and other objects can be accomplished by the provision of a data communication method for a mobile communication system, including the steps of a) determining whether data communication is needed between at least two MSs (Mobile Stations) located in a service area of one BTS (Base Transmit Subsystem); b) if the data communication between the MSs is needed, assigning one physical half-duplex data channel to the MSs in common; and c) if data is transmitted to the MSs over a downlink channel of the half-duplex data channel, adding a header to the data to create data, and transmitting the data to the MSs.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
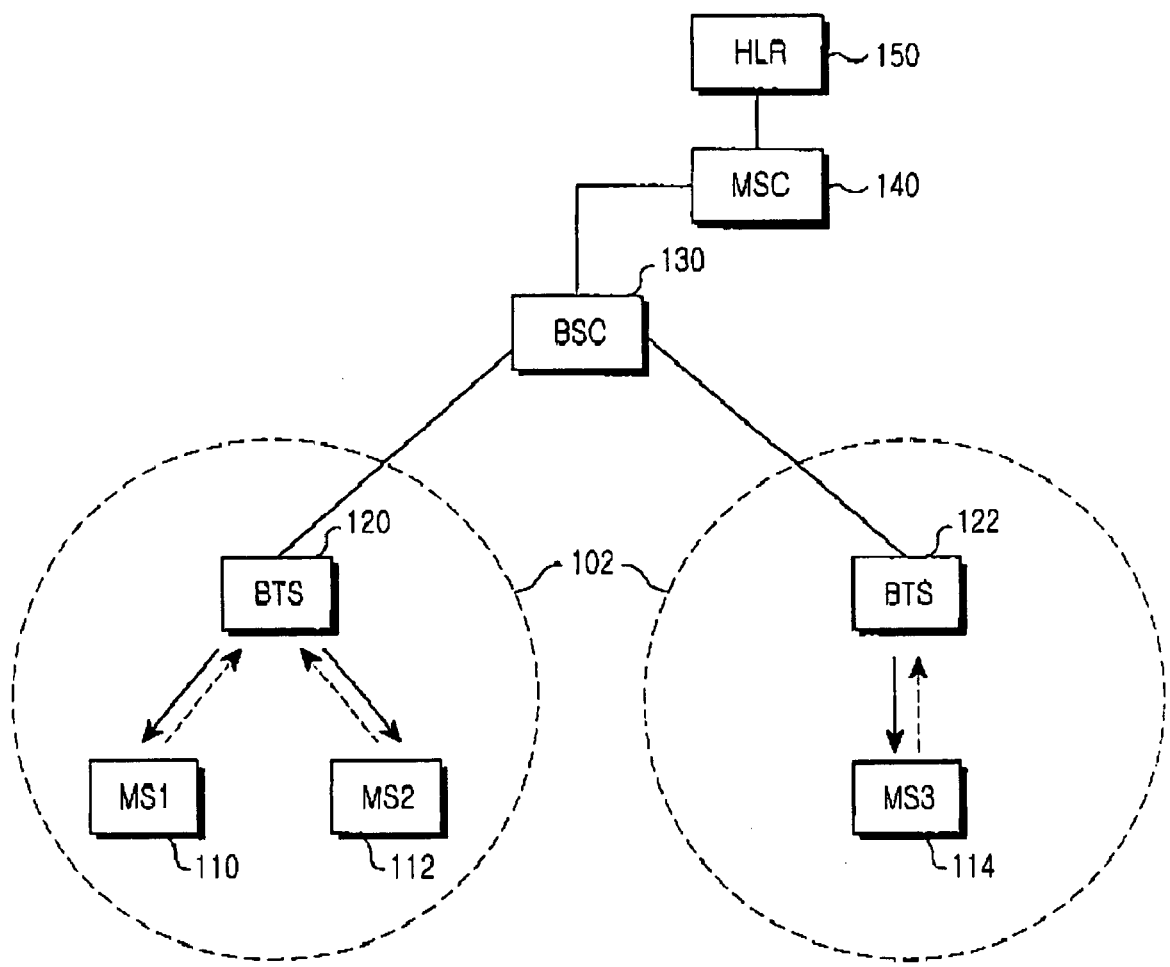
FIG. 1 is a view illustrating a schematic diagram of a conventional mobile communication system.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

According to the present invention, in the case where a data communication is established between at least two MSs within one BTS service area, the BTS allocates one physical channel between the two MSs. Provided that data transmission is established over one downlink channel while the BTS transmits data to at least two MSs, these MSs only receive the data without any operation. Therefore, the BTS divides transmission data in block units, and displays a receiver of a corresponding data block on a header of each data block. In this case, a candidate for the receiver may be one or more than two MSs. In the case where the MSs transmit data to the BTS over one uplink channel, only a qualified MS having authority to transmit the data to the BTS is able to perform such data transmission. Typically, in case of receiving uplink traffic data other than signaling information, the BTS transmits the same traffic data in a downlink direction. In this way, the BTS serves as an amplifier between at least two MSs at a short distance.

Figure 2:
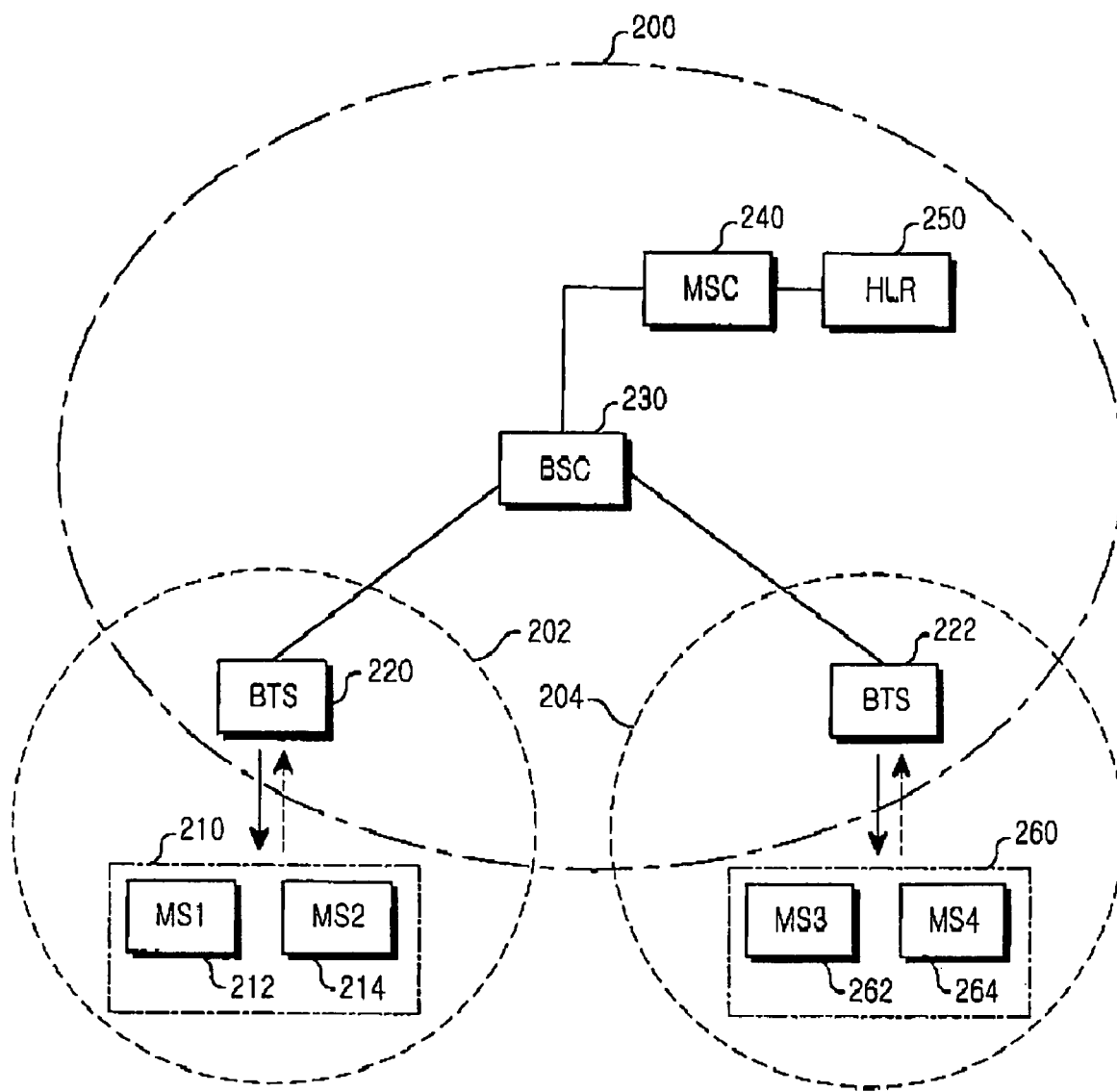
FIG. 2 is a view illustrating a schematic diagram of a mobile communication system in accordance with a preferred embodiment of the present invention.

FIG. 2 is a view illustrating a schematic diagram of a mobile communication system in accordance with a preferred embodiment of the present invention. A plurality of MSs 212, 214, 262 and 264 shown in FIG. 2 are designed to establish a half-duplex data connection service according to the present invention. For this purpose, the MSs 212, 214, 262 and 264 are registered to the half-duplex data connection service in a mobile communication system. The MSs 212, 214, 262 and 264 are implemented to control half-duplex data. That is, the MSs 212, 214, 262 and 264 generate data format for a half-duplex data communication on a core network 200. The MSs 212, 214, 262 and 264 receive arbitrary data appropriate for the half-duplex data connection service from the core network 200.

Referring to FIG. 2, the MSs 212 and 214 receive a mobile communication service from a BTS 220, and the MSs 262 and 264 receive a mobile communication service from a BTS 222. The BTSs 220 and 222 are connected to a MSC 240 over a BSC 230. The MSC 240 performs a call connection/switching function for processing incoming/outgoing request signals entering the MSs 212, 214, 262 and 264. HLR 250 is a database for storing/managing data of mobile phone subscribers. The HLR 250 registers or deletes a subscriber's location, and inquires about subscriber information.

According to the present invention, the BTS, the BSC, the MSC and the HLR for providing such MSs with such a mobile communication service are defined as a core network. In other words, a network for providing mobile phones with a mobile communication service is defined as a core network according to the present invention.

The MS 212 connected to one BTS 220 requests the BTS 220 to establish a half-duplex data connection between itself 212 and another MS. The half-duplex data connection request of the MS 212 is created in the same manner as in a typical mobile communication system; that is, the MS 212 uses a common channel. It should be noted, however, that a predetermined service code for the half-duplex data connection service is prescribed between the MS 212 and the core network 200. So, the MSs 212, 214, 262 and 264 transmit a predetermined counterpart MS information and the predetermined service code to the core network 200 in such a way that such a half-duplex data connection request to the BTS is established.

In the case where the MS 212 transmits to a core network 200 such a half-duplex data connection request to other MS 214 connected to the BTS 220 (also connected to the MS 212), the core network 200 searches a database contained in either the HLR 250 or a VLR (Visitor Location Register) (not shown) to determine whether the MS 214 receiving the half-duplex data connection request gains access to the same BTS (i.e., 220). Then, the core network 200 determines whether the MS 214 is capable of performing the half-duplex data connection service by determining whether the MS 214 is registered to the half-duplex data connection service in a mobile communication system. In other words, all the MSs must inform the mobile communication system of prescribed information for indicating whether or not they support the half-duplex data connection service at a prescribed time at which they are registered to a network. As described above, it is necessary for the MS 214 to generate a data format for a half-duplex data communication on the core network 200, receive data appropriate for the half-duplex data connection service from the core network 200, and process the data. Provided that there is no information for indicating that the half-duplex data connection service is available, the BTS may check whether the half-duplex data connection service is available in a counterpart MS over an additional common channel after substantially paging the counterpart MS. This condition check procedure may be different in individual mobile communication systems.

If the MS 214 does not gain access to the same BTS 220, the half-duplex data connection request transmitted from the MS 212 to the MS 214 is denied. For example, in the case where the MS 212 transmits to the core network 200 a half-duplex data connection request to other MS 262 or 264 connected to other BTS 222 instead of the BTS 220, the core network 200 denies the half-duplex data connection request from the MS 212.

With reference to FIG. 2, in the case where the MS 214 receiving the half-duplex data connection request message from the MS 212 is located in a service area 202 of the same BTS 220 and the half-duplex data connection service is available, one physical channel is assigned the MSs 212 and 214. Prior to such a physical channel assignment, it is noted that the core network 200 must page the MS 214 and transmit half-duplex data connection channel information to the MS 214.

The half-duplex data channel is shared with an uplink channel and downlink channel, respectively, and has the following characteristics. After performing such a half-duplex data channel allocation, the concept of a caller (i.e., the MS 212 in the present invention) and a callee (i.e., the MS 214 in the present invention) is of little importance, but discrimination between a sender and a receiver is of importance. In this case, a sender is defined as an arbitrary MS with uplink authority as follows.

Referring back to FIG. 2, if the core network 200 assigns one physical half-duplex data channel to the MSs 212 and 214, the MSs 212 and 214 serve as one virtual MS 210 for the BTS 220 (or the core network). Therefore, the MSs 212 and 214 simultaneously receive all the data transmitted from the BTS 220 to the half-duplex data channel in the downlink direction of the half-duplex data channel between the virtual MS 210 and the BTS 220. The downlink channel information between the virtual MS 210 and the BTS 220 includes a traffic data block for a receiver, and a signaling data block between a sender and the receiver.

The BTS 220 divides data to be transmitted into a plurality of data blocks, and indicates a receiver of a corresponding data block on a header of each data block. In this case, a candidate for the receiver may be one or more than two MSs. Such receiver information is transmitted using either a unique number for indicating a corresponding MS, or bitmap information. The MSs 212 and 214 in case of signal reception reply to corresponding traffic and signal only when they are indicated as a destination in a data block header. Similarly, the MSs 212 and 214 ignore the corresponding traffic and signals when they are not indicated as a destination in a data block header.

In the meantime, if the core network 200 assigns one physical half-duplex data channel to the MSs 212 and 214, the MSs 212 and 214 serve as one virtual MS 210 for the BTS 220 (or the core network). Therefore, only one of the MSs 212 and 214 is able to transmit a data block to the BTS 220 in the uplink direction of the half-duplex data channel between the virtual MS 210 and the BTS 220.

Uplink channel information between the virtual MS 210 and the BTS 220 includes a sender's traffic data block, a sender's signaling data block, and a receiver's signaling data block, etc. Here, the signaling data block includes a traffic data ACK (ACKnowledgement) and a signaling data ACK. The ACK information is adapted to indicate success or failure of corresponding data block reception and, if necessary, is also adapted to induce data retransmission.

If the MSs 212 and 214 receive the traffic and signal, they should inform the BTS 220 of ACK information of the received traffic and signal, i.e., success or failure of corresponding data block reception, in order to establish stable data communication. In this case, the MS receiving the data block has no authority to use an uplink channel as a receiver. Only a qualified MS having authority to use such an uplink channel can transmit data to the BTS 220 in the uplink direction. Therefore, one or more receiver MSs among a plurality of MSs making a half-duplex data connection state must have periodic uplink authority.

In more detail, in order to allow the MS 214 receiving the data block to transmit reporting ACK data of the received data block to the core network 200, a mobile communication system of the present invention periodically assigns a small-sized uplink space to the MS 214. As a result, the MS 214 receiving the data block can transmit the reporting ACK data, i.e., success or failure information of the data block's reception, to the core network 200.

Such a reporting ACK data is important when establishing synchronization with a receiver. For example, a GSM (Global System for Mobile communications) system needs to successively update necessary TA (Timing Advance) information with change in geographical locations involving a corresponding MS therein. But, unless the GSM system successively updates the TA information, it cannot establish a stable uplink transmission. For this stable uplink transmission, the receiver needs to perform a periodic uplink function, such that even the receiver can easily function as a sender without additional synchronization.

For this operation, such an uplink channel is divided into a plurality of sub-channels on a time domain to allow the MSs to be individually assigned sub-channels, such that the MSs share the uplink channel with one another. Likewise, in the case where a sender finishes transmission of all the traffic information, additional signaling information is transmitted to the core network 200 according to the authority to use the uplink channel, such that a request to return the authority to use the uplink channel is transmitted to the core network 200. In this case, the core network 200 transmits all the traffic to the receiver, and gives the receiver the requested uplink channel use authority using additional signaling information. Therefore, if an arbitrary MS defined as a new sender has no transmission information, the arbitrary MS transfers its own uplink channel use authority to a counterpart MS in the same manner as the above. Such a transfer of the uplink channel use authority is repeated until one MS attempting to complete such data connection status, among a plurality of MSs using the half-duplex data channel, generates a termination request via additional signaling information.

If the traffic data other than signaling information is received in an uplink direction, the core network 200 transmits the same traffic data in a downlink direction. Likewise, the core network 200 serves as an amplifier between all MSs located within a short distance range.

Figure 3:
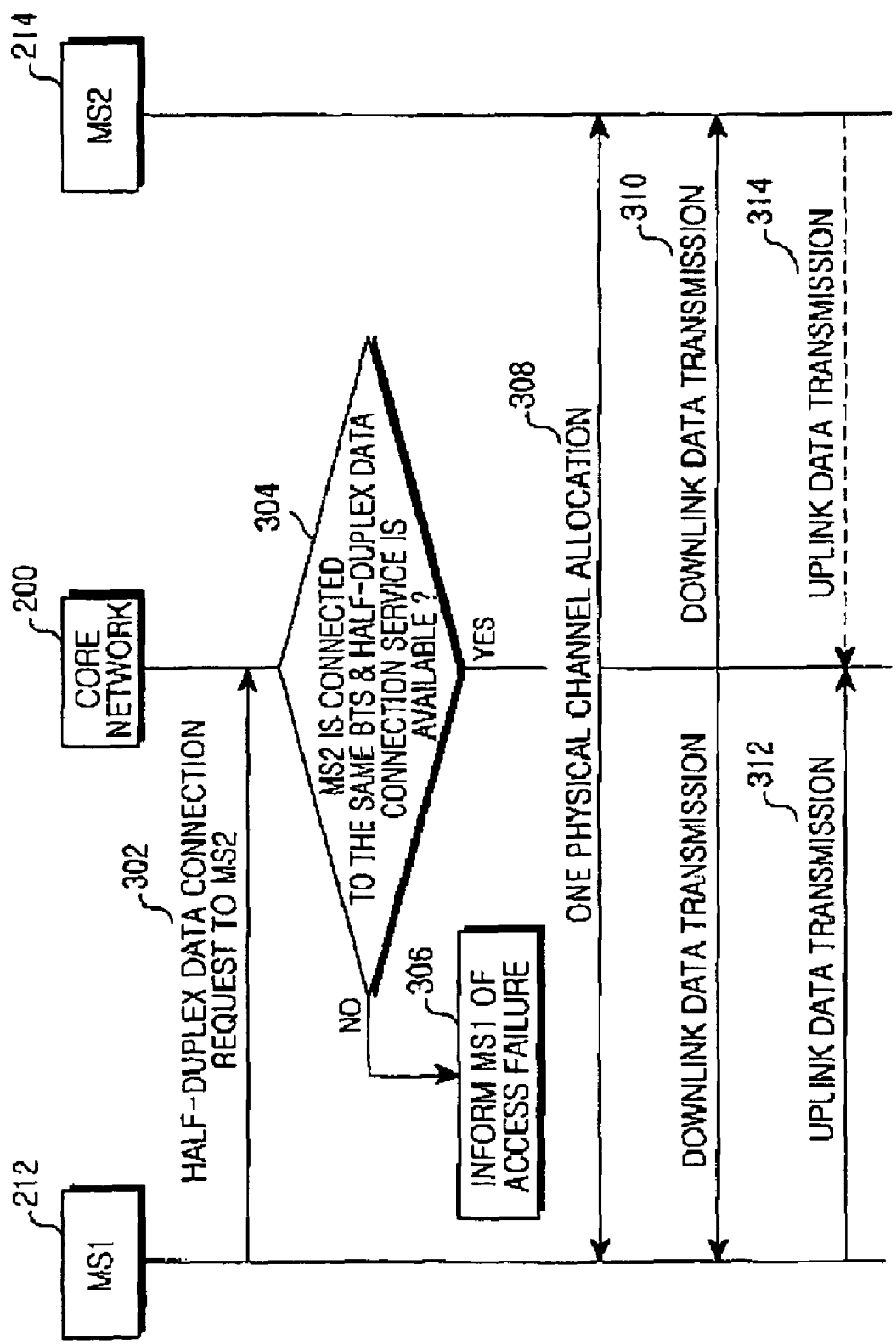
FIG. 3 is a flow chart illustrating a half-duplex data connection procedure in accordance with a preferred embodiment of the present invention.
Figure 4:
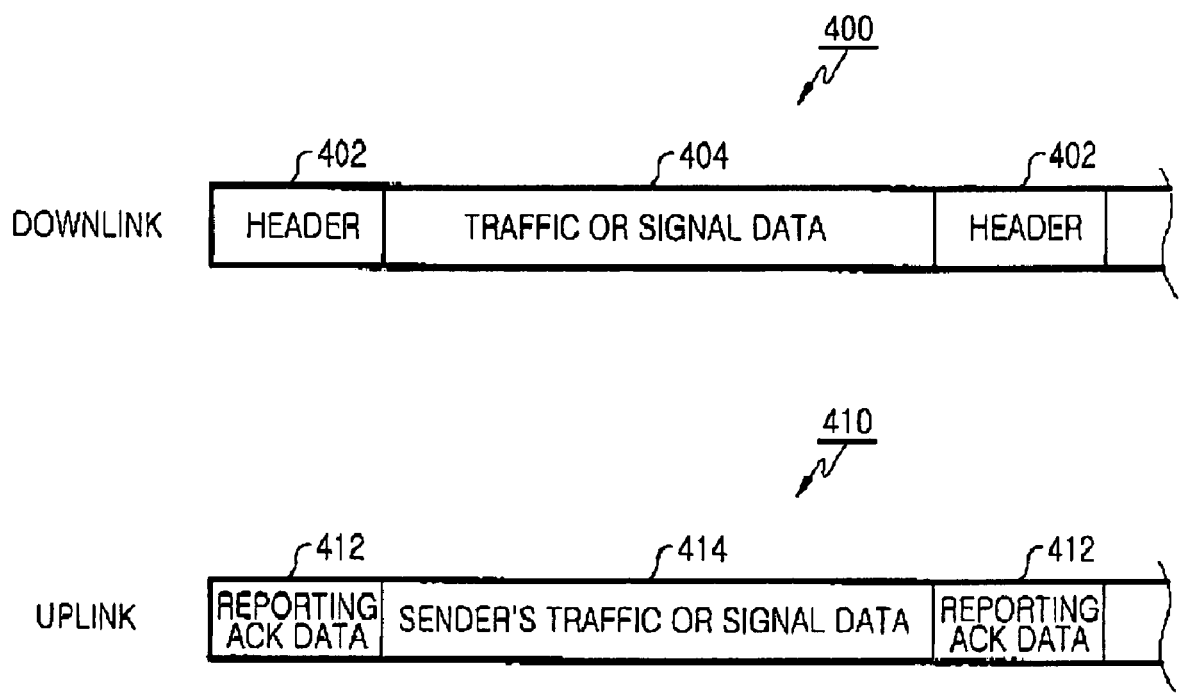
FIG. 4 is a view illustrating the appearance of transmission/reception data formats on a data channel in accordance with a preferred embodiment of the present invention.

FIG. 3 is a flow chart illustrating a half-duplex data connection procedure in accordance with a preferred embodiment of the present invention, and FIG. 4 is a view illustrating the appearance of transmission/reception data formats on a data channel in accordance with a preferred embodiment of the present invention.

Referring to FIGS. 2~4, the MS 212 transmits a half-duplex data connection request to the MS 214 over the core network 200 at step 302. Upon receiving the half-duplex data connection request from the MS 212, the core network 200 determines on the basis of the half-duplex data connection request whether the MS 214 is located in a service area of the BTS 220 connected to the MS 212 at step 304, and also determines whether the MS 214 is able to perform a half-duplex data connection service at step 304. As stated above, such determination at step 304 is based on prescribed information indicating whether the MS 214 is registered to the half-duplex data connection service in a mobile communication system. If the MS 214 is disconnected from the BTS 220 of the MS 212 or the half-duplex data connection service is not available at step 304, a mobile communication system informs the MS 212 of a failure of the half-duplex data connection service at step 306.

Otherwise, if the MS 214 is connected to the BTS 220 of the MS 212 and the half-duplex data connection service is available at step 304, the core network 200 adapts the MS 212 and the MS 214 to be one virtual MS and assigns one physical half-duplex data channel to the one virtual MS at step 308. Thereafter, the core network 200 transmits to the MSs 212 and 214 a data block in a downlink direction of the half-duplex data channel at step 310. In this case, the core network 200 divides transmission data into block units, and indicates the receiver of a corresponding data block on a header of each data block. In this case, a candidate for the receiver may be one or more than one MS. A data block format 400 transmitted to the MSs 212 and 214 is depicted in FIG. 4. The data block is composed of a header 402 and a traffic or signal data 404. The header 402 may indicate a receiver of a corresponding data block as aforementioned. So, the MSs 212 and 214 receiving the data block reply to a corresponding traffic or signal data 404 only when they are indicated as destination information in the data block header 402. Similarly, the MSs 212 and 214 ignore the corresponding traffic and signal data 404 when they are not indicated as the destination in the data block header 402.

In addition, the core network 200 allows only one of the MSs 212 and 214 to transmit such a data block to the BTS 220 in the uplink direction of the half-duplex data channel between the virtual MS 210 and the BTS 220 at steps 312 and 314. The dotted line of FIG. 3 indicates that uplink of MS2 can be limited. A data block format 410 transmitted from the MSs 212 and 214 to the core network 200 is also depicted in FIG. 4. The data block is composed of a reporting ACK data 412 and a sender's traffic or signal data 414. As stated above, a small-sized uplink space 412 is periodically assigned the MS 212 or 214 receiving the data block, such that the MS 212 or 214 can transmit the reporting ACK data 412 of the received data block to the core network 200. As a result, the MS 212 or 214 receiving the data block can transmit the reporting ACK data 412 of recently received data block, i.e., success or failure information of the current reception data block, to the core network 200, therefore, if necessary, the MS 212 or 214 may request the core network 200 to retransmit the necessary data block. The MS 212 or 214 having authority to use an uplink channel is assigned an uplink space 414 through which data transmission to a counterpart MS is performed. Therefore, the MS 212 or 214 transmits traffic or signal data to the core network 200 as a sender.

As apparent from the above description, in accordance with the present invention, in the case where data communication between at least two MSs located in a service area of one BTS is established, the BTS assigns one physical channel between the MSs, thereby preventing unnecessary consumption of resources and making it possible for a mobile communication system to make effective data transmission on the condition that it is determined that a short distance half-duplex data connection service is preferable.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A data communication method for a mobile communication system, comprising the steps of:
    a) determining whether data communication is needed between at least two MSs (Mobile Stations) located in a service area of one BTS (Base Transmit Subsystem);
    b) if the data communication between the at least two MSs is needed, assigning one common physical half-duplex data channel to the at least two MSs; and
    c) if data is transmitted to the at least two MSs over a downlink channel of the half-duplex data channel, adding a header indicating a receiver of a corresponding data block to each data block of the data, and transmitting the header and the data to the at least two MSs.

2. The method as set forth in claim 1, wherein the at least two MSs receiving the data reply to corresponding traffic or signal data only when they are indicated as a destination in a header of the data.

3. The method as set forth in claim 1, wherein one of the at least two MSs has authority to transmit the data over an uplink channel of the half-duplex data channel.

4. The method as set forth in claim 3, wherein the authority is removed by transmitting additional signaling information to the BTS when the one of the at least two MSs finishes transmission of all the data.

5. The method as set forth in claim 2, wherein the replying MS is periodically assigned a small-sized uplink space to transmit reporting ACK (ACKnowledgement) data for the received data.

6. A method for establishing data communication between at least two MSs (Mobile Stations) in a mobile communication system, comprising the steps of:
    a) determining whether a called MS is located in a service area of one BTS (Base Transmit Subsystem) connected to a caller MS;
    b) if the called MS and the caller MS are located in the service area of the BTS, requesting to establish half-duplex data connection between the caller MS and the called MS;
    c) if the called MS had reported that it supports half-duplex data communication when it registered in network, and the data communication between the caller MS and called MS is needed, assigning one common physical half-duplex data channel to the caller MS and the called MS; and
    d) if data is transmitted over a downlink channel of the half-duplex data channel assigned in common, adding a header to the data, and transmitting the data with the header.

* * * * *